Sept. 1, 1959　　　　　　　　　　　　　　　　　　　　　　2,902,602
N. JEAN-MARIE PIERRE-FRANCOIS CHASSENDE-BAROZ
RADIATION DETECTION DEVICE
Filed April 27, 1954　　　　　　　　　　　　　　　　　2 Sheets-Sheet 1
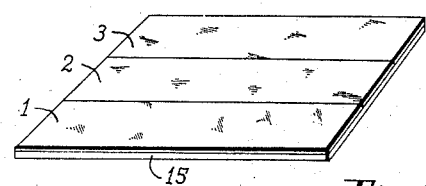
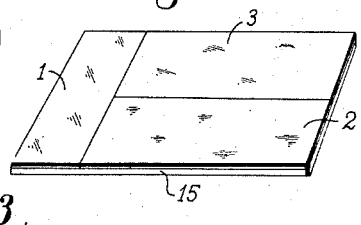
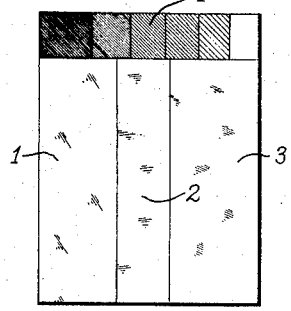
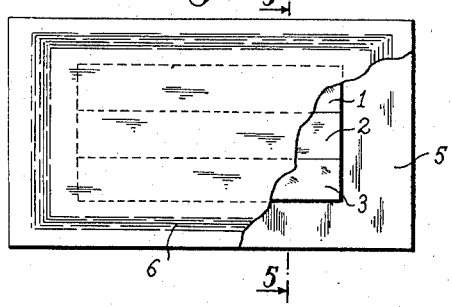
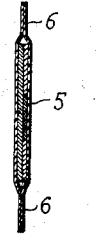
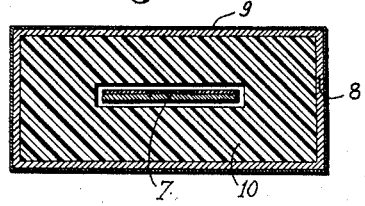
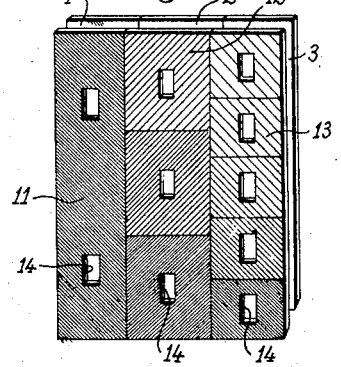

Sept. 1, 1959  N. JEAN-MARIE PIERRE-FRANCOIS CHASSENDE-BAROZ  2,902,602
RADIATION DETECTION DEVICE
Filed April 27, 1954

United States Patent Office 2,902,602
Patented Sept. 1, 1959

2,902,602
RADIATION DETECTION DEVICE

Norbert Jean-Marie Pierre-François Chassende-Baroz, Malakoff, France

Application April 27, 1954, Serial No. 425,974

Claims priority, application France April 30, 1953

5 Claims. (Cl. 250—65)

The present invention relates to a method and apparatus for measuring radiations of the shorter wavelengths and, in particular, gamma radiation.

Several types of devices, commonly called dosimeters, have already been proposed, for detecting gamma radiation, and showing the quantity of radiation (or dosage) to which the device has been exposed. Thus there exist, for instance, chemical dosimeters, electrostatic dosimeters and photographic dosimeters. The present invention relates to dosimeters of the latter type.

Usually, the photographic dosimeters comprise a light-sensitive element, in which the radiation to be measured forms a latent image. This latent image is developed and its optical density is compared with a calibrated density. More recently, personal dosimeters were described which allowed processing outside a laboratory; to make easier the measurement of the quantity of radiation received on the apparatus, the photographic element is a photo-sensitive paper, and the calibrated density appears on a comparison scale printed on paper. However, such a dosimeter can give valuable indications only if the development is accomplished under standardized conditions of time, temperature and composition of the developer; such conditions are not always available outside a well-equipped laboratory.

An object of this invention is to provide a process for photographically measuring radiations of the shorter wavelengths, including gamma radiation, which is not subject to the above-mentioned drawbacks. This process is particularly remarkable in that it comprises forming a latent image, by means of some radiation, in a first photographic emulsion serving as a check, said latent image once formed being substantially insensitive to the radiation to be measured, and after a second photographic emulsion sensitive to said radiation to be measured has been exposed to said radiation, simultaneously co-developing both emulsions, the first reference emulsion serving to check the development time, and the quantity of radiation being determined after the development is completed by comparison of the density of the second emulsion, with a calibrated density.

Another object of the invention is to provide a novel photographic element for carrying out the above process, said product being particularly remarkable in that it comprises several photographic emulsions, at least one of which is sensitive to the radiation to be measured, while another one, used as a check emulsion, contains a latent image apt to become visible upon simultaneous processing of all the emulsions, in order to check the time of this development, this latent image being substantially insensitive to said radiation to be measured.

According to a first embodiment of the invention, the latent image is formed in an emulsion which is substantially insensitive to the radiation to be measured.

It has however been found that other light-sensitive products may be used as a reference emulsion on account of the fact that after having received a suitable latent image, the light-sensitive emulsion becomes substantially insensitive to the radiation to be measured at least so far as concerns radiation quantities that are equal to or less than the maximum quantities of use. This is true in the case of silver halide emulsions which have been exposed to an illumination at least sufficient to attain after development substantially maximum density.

Thus according to a second embodiment of the invention, the process consists in forming a latent image, by means of some radiation, or some fogging treatment, in a first light-sensitive reference emulsion sensitive to the radiation to be measured, this first emulsion, after formation of this latent image, being substantially no longer affected by a subsequent exposure to the radiation to be measured at least so far as concerns radiation quantities equal to or less than the maximum quantities of use and after a second light-sensitive emulsion sensitive to the radiation to be measured has been exposed to said radiation, simultaneously co-developing both emulsions, the first reference emulsion serving to check the development time, and the quantity of radiation being determined after the development is completed by comparison of the density of the second emulsion with a calibrated density.

Apart from silver chloride emulsions, there may therefore be used, in accordance with the invention, as a reference emulsion the usual silver gelatino-halide emulsions forming images upon development, for example silver-chlorobromide, chloriodide, chlorobromiodide or bromiodide.

Preferably, in order to allow the quantity of radiation to be determined within a wider range of values, two emulsions that are unequally sensitive to the radiation to be measured, are coated, together with the check emulsion, on the same support or on distinct supports.

According to one embodiment of the invention, usable as applied to gamma radiation, one of these emulsions can differentiate exposures within the range from about 0 to about 150 roentgens, while the other emulsion can differentiate exposures within the range of from about 100 to about 600 roentgens.

The various emulsions, including the check emulsion, either coated on one support or on a plurality of supports, may be enclosed in an envelope opaque to actinic light.

Still another object of the invention is to provide a device for the dosimetric detection of radiations of the shorter wavelengths, particularly remarkable in that it comprises a photographic element such as defined above, enclosed in a filter box, the absorption of which is such that the response to radiations within a wide range of energy values is linear.

The photographic element of the invention may be in the form of a photographic plate, film or paper. In the following description, we refer more particularly to photographic papers, because these can be used conveniently in the the device of the invention, but it will be understood that while the photographic papers are preferred, for the reason above and for other reasons which will be set forth hereinafter, photographic films and plates may be used instead of photographic papers.

Hence, owing to the invention, there may easily be obtained, with an approximation sufficient for practical purposes, a determination of the quantity of radiation to which a person, carrying upon him a dosimeter containing the photographic element according to the invention, had been exposed. In the dosimeter itself, or in the laboratory dark room or safe-lighted room if the dosimeter does not permit a developing operation, the light-sensitive check emulsion and the emulsions sensitive to the radiation to be measured are simultaneously co-developed.

The development time necessary for a correct development of these latter emulsions essentially varies notably with the temperature, the composition and the state of the developing baths. However, the operator has no need to be concerned with this development time, since he is informed that the development is correct when the optical density of the check paper attains a pre-determined value.

The invention also provides means permitting easily checking that this correct development time has been attained, this means consisting in the use of a reference mark applied on the reference emulsion and whose brightness is such that in the course of the development of this emulsion the apparent extinction of this mark occurs when the development time has attained the correct value.

This reference mark may be obtained by any appropriate means before or after formation of the latent image, for example by an application of ink.

According to a preferred embodiment of the invention, there is applied locally on the check emulsion a developer before or after formation of the latent image so as to constitute upon development one or several reference marks of appropriate density. When simultaneously co-developing the check emulsion and the measuring emulsion or emulsions, owing to the fact that a proportion of the developer is already present in the check emulsion, the density increases more rapidly in the zone or zones where the developer has been applied and it attains a given valve before the other zones of the check emulsion. During this period the density of the other zones increases at first slowly and then more rapidly until the contrast in brightness between these zones and the zone or zones where the developer has been applied becomes less than the threshold of ocular differentiation of the details of brightness in the low lighting conditions of red or other safe-lighting used in developing; the eye perceives, then, a uniform density over the whole surface of the check emulsion. If the speed of penetration of the developer has been suitably regulated by applying on the check emulsion a gelatin overcoat of appropriate thickness and/or hardening this overcoat, it is ensured that the development of the measuring emulsions is correct as soon as the check emulsion shows an apparent uniform density. Further, owing to the fact that the zone or zones where the developer has been applied attain the given density a certain period of time before the other zones of the check emulsion, the operator is informed of the approaching completion of the development.

Some non-limitative illustrative examples of some embodiments of the invention are shown in the accompanying drawings.

In these drawings, wherein like reference characters denote like parts throughout:

Figs. 1, 2 and 3 show three embodiments of the invention, wherein the papers are coplanar;

Fig. 4 illustrates the outside of a packet including the sensitive element of the invention;

Fig. 5 is a section on line 5—5 of Fig. 4;

Fig. 6 is a cross-section of a filter-box according to the invention for dosimetric detection of gamma radiation;

Fig. 7 illustrates a device with a grey scale;

Figure 8:
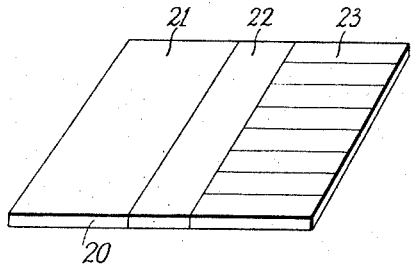
Fig. 8 shows an element before exposure to the radiation whose quantity or dose is to be measured.

It is a well-known fact that the greater the energy of a radiation, the more the said radiation tends to go through a given photographic emulsion without exposing it. Thus, a silver chloride emulsion of the type generally used for photographic papers is sensitive to light, but is hardly fogged by a strong dose of X-rays and is substantially insensitive to gamma radiation, whatever the dosage may be. Therefore, it is possible to associate a check paper coated with an emulsion of this type, in which a latent image has been previously formed, with a photographic paper sensitive to gamma radiation, and to develop both papers simultaneously, the apparition of the image on the check paper indicating that development has been correct. Thus, it can be ensured that the gamma-sensitive measuring paper has been completely developed and it is then possible, without making important errors, to determine the quantity of gamma radiation to which the element has been exposed, by comparison of the density obtained on the measurement paper, with the densities of a calibrated scale, either produced photographically or printed.

The emulsion used for the check paper must be selected, on the one hand, in such a way that the pre-formed image therein will not alter during the time which elapses, in ordinary use, between the formation of the latent image and the development, and on the other hand, in such a way that it will be certain that the gamma-sensitive measurement paper has been subjected to a correct development time, when the density obtained upon development has reached a determined value.

In selecting the emulsion of the gamma-sensitive paper, one should be guided by the contemplated use of the said paper. When the problem is to measure the quantities of gamma-radiation which may have been received by persons exposed for several days to the action of residual gamma emitting products scattered within a certain area, it is advisable to use a faster emulsion than when it is desired to record the quantity of gamma radiation which could reach people in a very short period, in the case of an event producing large quantities of nuclear energy. As a matter of fact, in the former case, the photographic product must be capable of differentiating doses of multiples of ten roentgens, while in the latter case the quantity of gamma radiation which is important to know amounts to several hundreds of roentgens.

A photographic element useful in a versatile dosimeter can be realised by associating the check paper of the invention, with a gamma-ray sensitive element, comprising an emulsion differentiating dosages of gamma radiation within a range from 0 to 150 roentgens, and an emulsion differentiating dosages within a range from about 100 to 600 roentgens. Such limits make it possible to obtain in each range of values, by a proper selection of the emulsions, density-exposure curves that are very close to a straight line.

For example, an ammoniacal silver bromiodide emulsion with large grains of as uniform size as possible, may be used as the emulsion designed to record the quantities of gamma radiations between 0 and 150 roentgens, while a pure silver bromide emulsion with fine grains as uniform as possible may be used for recording radiation dosages between 100 and 600 roentgens.

It is also pointed out that if one desires to check the quantity of gamma radiation to which are exposed people working in a factory where products emitting gamma radiations are used, it is advisable to employ a still faster emulsion, since the recorded doses are still smaller.

For example, a silver-bromiodide emulsion used according to the invention for the range from 0 to 150 roentgens, may be prepared from the following solutions:

Solution A:
    Silver nitrate _____ g__ 200
    Water _____ cc__ 3500
    20% ammonia _____ cc__ 250
    Gelatin _____ g__ 60
Solution B:
    Potassium bromide _____ g__ 150
    Potassium iodide _____ g__ 0.1
    Water _____ cc__ 700

The solution A was rapidly poured into the solution B, both being at a temperature of 40° C. The mixture was ripened at 60° C. for five minutes, cooled, shredded and washed for two hours. Then the shreds were re-melted. 300 g. of dry gelatin were added, and the product was ripened for fifteen minutes at 60° C.

A silver bromide emulsion, usable in the invention for the range from 100 to 600 roentgens, may be prepared from the following solutions:

Solution A:
    Silver nitrate _____g__  200
    Water _____cc__ 4000
    Gelatin _____g__   40
    Sulfuric acid 10 N _____cc__   50
Solution B:
    Potassium bromide _____g__  200
    Water _____cc__  600

The solution A was rapidly poured into the solution B, both at a temperature of 40° C. 300 g. of dry gelatin were immediately added, and the whole was digested for fifteen minutes at 60° C.

The emulsion of the check paper may be a developing-out silver-chloride emulsion. For instance, one may use the emulsion described in the book of P. Glafkides, "Chimie Photographique," Paris, 1949, page 229, which can be prepared from the following solutions:

Solution A:
    Distilled water _____cc__ 1600
    Gelatin _____g__  200
    Sodium chloride _____g__   50
    Hydrochloric acid _____cc__    1
Solution B:
    Distilled water _____cc__  400
    Silver nitrate _____g__  100

The solution B was poured into the solution A at 60°–65°. The mixture was ripened at 65°–80° C. for 20 to 60 minutes, cooled, solidified at 5°–6° C. for six hours, shredded, washed for three hours with running water, drained, and re-melted at 40° C. 80 g. of gelatin and 1 g. of sodium chloride were then added.

It is well known that a silver chloride emulsion of the type mentioned is more rapidly processed than a silver bromide or silver bromiodide emulsion. This fact can be taken into account by delaying the development by increasing the thickness of the gelatin overcoat applied on the emulsion and/or hardening the overcoat. Thus, it is made certain that as soon as the blackening of the check paper is quite apparent, the measurement papers are correctly developed. Also it is possible not to delay the development of the check paper and to take into account the different rates of development of the check paper and the measurement papers respectively, the development of the latter being continued until a given period of time has elapsed after the blackening of the reference paper has been observed.

Moreover, it is well known that a silver chloride emulsion of the type mentioned blackens very rapidly as soon as the induction period is over. This fact, together with the fact that a variation of the development time doubling said development time from the moment when complete development is obtained does not substantially alter the shape of the curve of the emulsions used for measuring the quantity of gamma radiation, provides a delay which is practically sufficient between the moment when the blackening of the check paper is observed, and the moment when the development of the measurement papers is effectively stopped.

The following examples illustrate various embodiments of the photographic element of the invention.

In the embodiment illustrated in Fig. 1, the photographic element of the invention comprises three coplanar photographic papers 1, 2 and 3. The paper 1 is a check paper coated with a silver chloride emulsion of the type mentioned; this paper has been given a flash exposure to cause an image of uniform density to appear clearly when the papers 1, 2 and 3 are simultaneously processed. The paper 2 is coated with a gamma-ray sensitive emulsion capable of differentiating quantities of radiation within the range from 0 to 150 roentgens, such as a coarse-grained silver bromiodide emulsion of the type mentioned and the paper 3 is coated with an emulsion capable of differentiating quantities of gamma radiation within the range from 100 to 600 roentgens, such as a fine-grained silver bromide emulsion of the type mentioned.

These three papers can assume many different relative positions. Thus, their order of juxtaposition may be changed. To facilitate the observation of the blackening of the check paper 1, during the processing treatment, it may be advantageous to arrange said check paper as shown by Figure 2. Moreover, one of the papers 2 or 3 may be eliminated if the quantities of gamma radiation which are to be measured are all within a range covered by one of the papers.

Also, the check paper, containing a latent image according to the invention, may be detached from the measurement paper provided that said check paper is processed simultaneously with the measurement paper or papers.

The size of the product illustrated by Fig. 1 and Fig. 2 is for instance that of X-ray dental films, such as 32 x 41 mm., which allows the use of the equipment usually employed in the art for mounting the elements and for processing them. It is advantageous to use paper sizes which correspond to that of known photographic products. For instance, one may use for the check paper 1, and one of the measurement papers 2 or 3, 16 mm. strips, and for the other measurement paper an 8 mm. strip. The different widths of the two measurement papers help in avoiding mounting errors.

A calibrated grey scale, either printed or obtained by photographic means, may be associated with the three photographic papers as shown, for instance, in 4 (Fig. 3) in the case of the papers being arranged as shown by Fig. 1. Such scale allows, by comparing the density obtained on papers 2 and 3 and the densities of the scale 4, to determine the quantity of gamma radiation received on these papers. Instead of using a printed grey scale, one can also obtain a grey scale upon development, provided that the check paper 1 has been exposed through a sensitometric step-wedge rather than to a uniform illumination. In such a case, of course, the area which has received the greatest illumination is used to control the development of the measurement papers.

Although coating the three emulsions on one support paper is not excluded, it is more convenient to coat these emulsions on three papers which are subsequently assembled by pasting or clipping on one common support 15 (Figs. 1 and 2) or, as illustrated by Figs. 4 and 5, by insertion of the three papers between two plastic sheets 5, the edges 6 of which are then welded in any known manner. It is necessary only to cut the sheets 5 along one edge, to allow the development.

The element thus described must be protected from actinic light by an envelope which does not transmit said light, of the type, for instance, used for X-ray-dental films.

In Fig. 8 are shown three areas 21—22—23 on a common support 20. The area 21 corresponds to the light-sensitive part sensitive to the radiation to be measured, in its unexposed state (measuring emulsion). The area 22 corresponds to the part, undeveloped, which includes the latent image for determining in the course of developing the correct development time (check emulsion). The area 23 corresponds to the calibrated density part which permits a comparative determination of the quantity of radiation to which the light-sensitive area 21 has been exposed.

Figure 9:
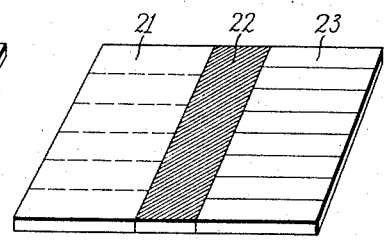
Fig. 9 shows the same element after developing.

After development, the result diagrammatically illustrated in Fig. 9 is obtained, namely, the calibrated area 23 has not changed in density; the area 22 has been developed up to for example its maximum density (development of the preformed latent image); and the area 21 has acquired from the development a density proportionate to its exposure. This density is compared with that of the area 23.

Figure 10:
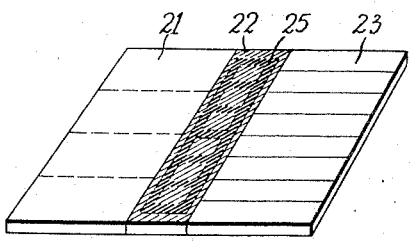
Fig. 10 is a similar view of an element according to the invention in the course of developing.
Figure 11:
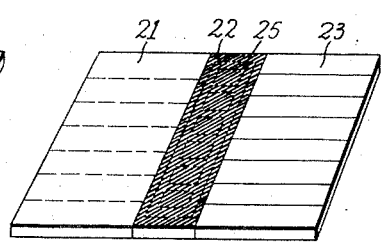
Fig. 11 shows the same element developed to the correct degree.

As it might be difficult to determine the desired development (maximum or otherwise) of the check area 22, there may be combined with the latter, in particular in the absence of a silver chloride emulsion, a reference mark 25 for example in the form of a grill as shown in Figs. 10 and 11.

The element is developed until the moment when in the inactinic light this grill disappears from sight, the brightness of the grill or other reference mark 25 and of the area 22 apparently merging into one.

There is shown in Fig. 10 the element in the course of development, the latter not having been completed since the grill is still clearly visible; whereas in Fig. 11 the grill 25 has become substantially invisible, this indicating the moment to cease the development.

The area 23 may be of uniform density as shown in the drawing or comprise a series of graduated calibrated densities of increasing intensity, which permits a more accurate comparison. An accurate comparison may also be obtained by the simultaneous use of a number of elements, such as those shown in Fig. 8, contained in a common packet, the calibrated areas 23 of uniform density varying in density from one element to another thereby constituting the various areas of a scale of densities. Thus after development it is possible to determine very accurately for which element the densities of the measuring area 21 and the calibrated area 23 are most allied.

It should furthermore be mentioned that in poor lighting conditions the ability of the eye to distinguish degrees of brightness increases with time, so that the operator after a more or less prolonged stay in the laboratory with red lighting perceives more distinctly the areas of the check emulsion which have received a localized application of developer, whereas at the start of this stay, for the same ratio of brightness between these areas and the other areas of the check emulsion, the latter appeared to have a uniform brightness. Hence the operator tends increasingly to prolong the development of the emulsions beyond the correct development time and risks arriving at a false measurement.

This disadvantage may be easily remedied by providing an auxiliary check reference sample comprising adjoining areas whose brightnesses are in the same ratio as the brightnesses that the areas of the check emulsion should possess at the instant when the development must be ceased. In a preferred form, this auxiliary reference sample is obtained by means of a uniform exposure of an emulsion identical to the check emulsion, a localized application of a developer, and a development and fixing in the known manner thereby producing adjoining areas of similar but unequal brightness. At the beginning of his stay in the laboratory, the operator places the auxiliary reference sample at such distance from the laboratory lamp that the brightness of this sample appears uniform and he observes the development of the check emulsions at this same distance. As soon as the eye becomes accustomed to the lighting conditions in the laboratory, it discerns the areas of different brightness of the auxiliary reference sample whereupon the operator moves this sample away from the lamp until the brightness is once more uniform and the development of the check emulsions is thenceforth observed at this new distance. This distance is modified each time the areas of different brightness of the sample are discernible by the eye. Hence in this manner the variation in the threshold of ocular sensitiveness to the ratios of brightness is easily compensated.

By way of example, the photographic element according to the invention may comprise three silver bromide light-sensitive papers about 32 mm. long, juxtaposed as described above on a common support having such dimensions as to be insertible in an envelope of an X-ray dental film without a lead screen. One of the light-sensitive papers carries for example an emulsion capable of differentiating quantities of gamma radiation within a range of 0–150 roentgens, the second light-sensitive paper carries an emulsion capable of differentiating quantities of gamma radiation within a range of 150–600 roentgens and the third light-sensitive paper or check paper contains a latent image formed for example by uniform exposure to light; furthermore, the check paper has received, after the formation of the latent image, a localized application of developer, for example over a series of transverse lines about 1 mm. wide.

The photographic element of the invention is intended for use in dosimeters of any known general type, either self-developing or not. Fig. 6 shows a cross-section of a simple dosimeter, usable when the photographic element can be processed in a laboratory. Its general form is that of a parallelepipedic box in which the photographic element 7, such as it has been described above, is enclosed. In order to level the effect of the radiations of various wavelengths, the box forms a filter of the type described in the National Bureau of Standards, Technical News Bulletin, vol. 35, July 1951, No. 7, pages 98–99. More particularly, it comprises a 1.07 mm. layer 8 of tin, a 0.3 mm. layer 9 of lead, and a layer 10 of a resin absorbing secondary electrons, such as a layer of Bakelite 8.25 mm. thick.

The photographic element of the invention may be enclosed in any other suitable holder to constitute a means of dosimetric detection according to the invention. One may use a holder arranged so as to constitute an automatic development device, thus eliminating the need of a fully equipped photographic laboratory. Such holders are known which allow the photographic element to be developed, as chambers or containers for the necessary doses of developer and fixing bath are adapted in the holder, the content of said chamber or container being brought into contact, in due time, with the element to be processed, which is enclosed in a compartment of said holder.

With the device of the invention it is easy, with practically sufficient approximation, to evaluate the quantity of radiation to which a person has been exposed, said person wearing a dosimeter containing the photographic element of the invention.

The check photographic element and the elements sensitive to the radiation to be tested are simultaneously developed in the dosimeter itself, or in a darkroom laboratory in the dosimeter is not self-developing, as is the case for a device of the type illustrated by Fig. 6.

The correct development time for elements of the latter type is essentially variable, and particularly depending upon the developing temperature and the composition and state of the baths, but if the check paper has been suitably chosen, as pointed out above, the operator need not pay attention to the development time since he will be warned of the correct development by the blackening of the check paper. When the correct development is completed, as indicated above, the operator has sufficient time to withdraw the photographic element from the action of the developer. As a matter of fact tests have shown that the normal time needed for this operation has practically no effect on the shape of blackening curve, in view of the tolerance in the development time from the moment when complete development is accomplished.

The determination of the quantity of radiation received is effected by comparing the density obtained on the radiation-sensitive emulsion with the density of a calibrated grey scale which may be achieved by photographic or printed means. If the radiation-sensitive element comprises two emulsions, respectively sensitive to quantities of radiation within different ranges of values, it is advisable to use one calibrated scale for each emulsion. As already pointed out, these scales may be obtained during the photographic processing of the measurement elements, if the latent image of a step-wedge has been formed in the check paper. Another convenient means consists of using a device such as shown by Fig. 7, in which it is supposed to be superimposed on the developed photographic element comprising the check paper 1, and the two measurement papers 2 and 3. This device is composed of a sheet of paper on which a strip 11 of uniform density has been printed adjacent to a grey scale 12 comprising, for instance, three densities, and a second grey scale 13 comprising, for instance, five densities. The strip 11 and each step of the grey scales 12 and 13 has an aperture 14 (in the strip 13, the apertures might be provided astride the adjacent steps).

This device is superimposed on the developed photographic paper, so that the strip of uniform density 11 covers the check paper 1; the grey scales 12 and 13 respectively, cover the measurement papers 2 and 3, and allow, through apertures 14 easy comparisons of the density of the papers 2 and 3, with one of the densities of the corresponding scale. The steps of the scales 12 and 13, may bear indication of the corresponding quantities of radiation.

To identify the photographic elements, one may, for instance, coat a small portion of the internal surface of the opaque envelope with a special ink similar to that used for carbon paper, in such a way that it is possible to record any useful indication outside the envelope, the inscription being automatically transferred on the portion of the photographic element under the carbon coating. This portion of the photographic element may be, for instance, a paper extension integral with the product.

Although the above description particularly refers to gamma radiation, it is to be understood that the invention is applicable to other radiations of the shorter wavelengths, such as X-rays, ultra-violet radiations etc., provided that the emulsions of the check paper and of the measurement papers are suitably chosen. Thus, it is possible to check whether the staff of radiology laboratories have been exposed to a dangerous quantity of X-rays.

While specific embodiments of the invention have been described hereinbefore, it is to be understood that many changes and modifications may be made therein without departing from the spirit of the invention or the scope of the appended claims.

Having now described my invention what I claim as new and desire to secure by Letters Patent is:

1. A photographic element for measuring radiations having wavelengths shorter than those of the visible spectrum, comprising at least one photographic strip which is sensitive to the radiations to be measured and another photographic strip which is substantially unaffected by said radiations within the useful exposure range and contains a uniform latent fog corresponding to the shoulder region of the characteristic curve for infinite gamma, said latent image being developable to a readily observable black density, in a period of time at least as long as the correct development time for said one photographic strip, all of said photographic strips being of the type in which the negative image can be continuously examined during development until the development is complete, whereby upon exposure of said element to said radiations, the image which becomes directly visible on said other photographic strip, during the simultaneous development of all the photographic strips of said element, may be used as a monitoring element for indicating accurately, while development is progressing, the moment at which said development becomes complete.

2. Photographic element for measuring radiations having wavelengths shorter than those of the visible spectrum, comprising at least one photographic strip which is sensitive to the radiations to be measured and another photographic strip which is substantially unaffected by said radiations within the useful exposure range and contains a uniform latent fog corresponding to the shoulder region of the characteristic curve for infinite gamma, said latent fog being developable to a readily-observable black density, in a period of time at least as long as the correct development time for said one photographic strip, said other photographic strip also containing a brightness reference mark, all of said photographic strips being of the type in which the negative image can be continuously examined during development until the development is complete, whereby upon exposure of said element to said radiations, during the simultaneous development of all the photographic strips of said element, the apparent extinction of said mark under definite safe-light illumination warns the operator that the fog on said other photographic strip has just been developed to said maximum density.

3. A photographic element as defined in claim 2 wherein said brightness reference mark is a portion of said other photographic strip having received a deposit of developer, whereby, during development of all the photographic strips of said element, said portion is completely developed to said density before the remaining portion of the said other photographic strip has been developed to a density which is visible under said definite safe-light illumination.

4. A photographic element for measuring radiations having wavelengths shorter than those of the visible spectrum, comprising at least one photographic strip which is sensitive to the radiations to be measured and another photographic strip which is substantially unaffected by said radiations within the useful exposure range, contains a uniform latent fog corresponding to the shoulder region of the characteristic curve for infinite gamma, and is coated with a layer of gelatine of such thickness and hardness as to delay the amount when said uniform latent fog, upon development, reaches a readily-observable apparent black density until after the correct development time of said one photographic strip has elapsed, said other photographic strip containing a portion having received a deposit of developer, all of said photographic strips being of the type in which the negative image can be continuously examined during development until the development is complete, whereby upon exposure of said element to said radiations, during the simultaneous development of all the photographic strips of said element, the apparent extinction under definite safe-light illumination of the density developed in said portion of said other photographic strip warns the operator that the fog on said other photographic strip has just been developed to said apparent black density.

5. A process for measuring radiations having wavelengths shorter than those of the visible spectrum comprising forming a uniform latent image in one photographic strip, said latent fog being substantially insensitive to said radiations, which comprises the steps of providing said one photographic strip with a brightness reference mark, then, upon exposure of at least another photographic strip to said radiations, simultaneously developing all of said photographic strips, the apparent extinction of said mark under definite safe-light illumination warning the operator that the development of said other photographic strip has become complete, said apparent extinction being observed at that distance from the source of light in said definite safe-light illumination at which a reference chart comprising visual densities which are in a predetermined ratio exhibits a uniform brightness, and determining the quantity of radiation by comparing the density developed in said other strip with a known density.

References Cited in the file of this patent

UNITED STATES PATENTS

| | | |
|---|---|---|
| 1,469,415 | Herzberg | Oct. 2, 1923 |
| 2,496,218 | Kieffer | Jan. 31, 1950 |
| 2,680,816 | Stern | June 8, 1954 |
| 2,747,103 | Fairbank et al. | May 22, 1956 |